United States Patent [19]

Wolfe

[11] Patent Number: 5,052,879

[45] Date of Patent: Oct. 1, 1991

[54] WHEELCHAIR LIFT AND TRANSFER SYSTEM

[76] Inventor: Clifford L. Wolfe, 62 Maple Ave. N., Smiths Falls, Ontario, Canada, K7A 2A7

[21] Appl. No.: 430,423

[22] Filed: Nov. 2, 1989

[30] Foreign Application Priority Data

Nov. 8, 1988 [CA] Canada .................................. 582480

[51] Int. Cl.[5] .............................................. B60P 1/00

[52] U.S. Cl. .................................. 414/541; 187/9 R; 414/921

[58] Field of Search .............. 414/540, 541, 545, 921; 280/751, 753; 187/9 R

[56] References Cited

U.S. PATENT DOCUMENTS

| | | | |
|---|---|---|---|
| 2,833,554 | 5/1958 | Ricordi | 280/751 |
| 3,310,342 | 3/1967 | Drelichowski | 280/751 X |
| 3,651,965 | 3/1972 | Simonelli et al. | 414/540 |
| 4,083,429 | 4/1978 | Abbott | 414/541 X |
| 4,909,700 | 3/1990 | Fontecchio et al. | 187/9 R X |

*Primary Examiner*—Joseph E. Valenza
*Assistant Examiner*—Keith L. Dixon

[57] ABSTRACT

The invention consists of a wheelchair lift frame, movable platform and transfer system. It is designed to enable the person in a wheelchair to independently enter a vehicle and drive from his/her wheelchair without transferring or leaving the wheelchair platform. In the first position the lift frame is folded inside the driver's door below the arm rest, and the platform, separate from the lift frame, is attached to rails, which are attached to the floor of the vehicle. A movable head rest is attached to the roof of the vehicle as a safety feature. When the lift mechanism is activated the lift frame is lowered and extended to the second position, outside the driver's door on a level with the vehicle floor. The platform moves sideways, by means of a caterpillar chain which catches on teeth on the lift frame, over a eight inch gap onto the lift frame assembly and is cantilevered over the lift frame in the third position. The lift frame and platform are now lowered to ground level to the fourth position. When the lift assembly reaches the ground, the ramp is lowered and the wheelchair is released. The occupant of the wheelchair leaves the lift by backing off the lift, parallel to the vehicle. When the wheelchair is on the lift platform it is anchored there by a bolt action through an attachment on the wheelchair.

3 Claims, 13 Drawing Sheets

WHEELCHAIR LIFT AND TRANSFER SYSTEM

The invention relates to an automatic wheelchair lift and transfer system to enable a person in a wheelchair to independently enter a vehicle and drive from his/her wheelchair with out transferring or leaving the wheelchair platform.

There are many wheelchair lifts on the market. These wheelchair lifts consist of one unit. Although other lift devices have used rails and rollers, they have never been used in the configuration as used in this application. Some lift the wheelchair platform and wheelchair by a lever action and using a screw action pull the platform into the vehicle, by a side opening. the wheelchair occupant then has to manoeuvre his/her wheelchair off of the lift and then transfer into a seat or manoeuvre his/her wheelchair off of the lift and into the driving position from the rear.

The unique difference with this wheelchair wheelchair lift assembly, is that the occupant stays on the lift platform, facing forward, along the longitudinal axis of the vehicle, and the platform detaches itself from the lift frame and moves sideways into the vehicle, allowing the occupant of the wheelchair to face forward and be able to drive from this position. The platform leaves the lift mechanism completely and crosses an eight inch gap. When the platform is on the lift frame it is cantilevered over the lift frame.

The wheelchair lift and platform are much more compact than any other system. It uses only the space of the platform and thereby leaves the remainder of the interior of the vehicle free for passengers. It is also the only system to place the occupant of the wheelchair into the driver position without leaving the lift platform, and by way of the driver's door. All other wheelchair lifts use side or rear entry, which means the person in the wheelchair has to leave the lift platform and either transfer into a car or van seat or manoeuvre their wheelchair behind the steering wheel. This system takes up most of the interior of the vehicle.

No other art has a system that secures the wheelchair to the lift platform, before it leaves ground level, making for a safer delivery system, the wheelchair is unable to fall off the wheelchair platform.

No other art has a movable head rest which can be moved into position when the driver is in the driving position.

No other art has a movable lift platform, which can leave the lift assembly sideways into the vehicle and then move forward to position it behind the steering wheel.

No other art allows the platform to cross a gap from the vehicle to the lift frame.

The object of a compact lift and transfer system for a vehicle for use by the occupant of a wheelchair is to enter, to leave and to drive from the wheelchair on the lift platform. This enables the person to get into the driving position in the least amount of time and strain and to drive in a comfortable position. It allows for adjustment, good visibility and safety. The wheelchair is anchored to the platform by an anchor devise and when the platform and wheelchair are in position behind the steering wheel a movable head rest can be put in a correct position behind the drivers head. Except for the driving station the rest of the vehicle has not been altered.

The wheelchair lift and platform can be installed in the passenger side of the vehicle. This allows for easy access and the ability to see out of the vehicle as a passenger.

DETAILED DESCRIPTION OF THE DRAWINGS

Figure 1:
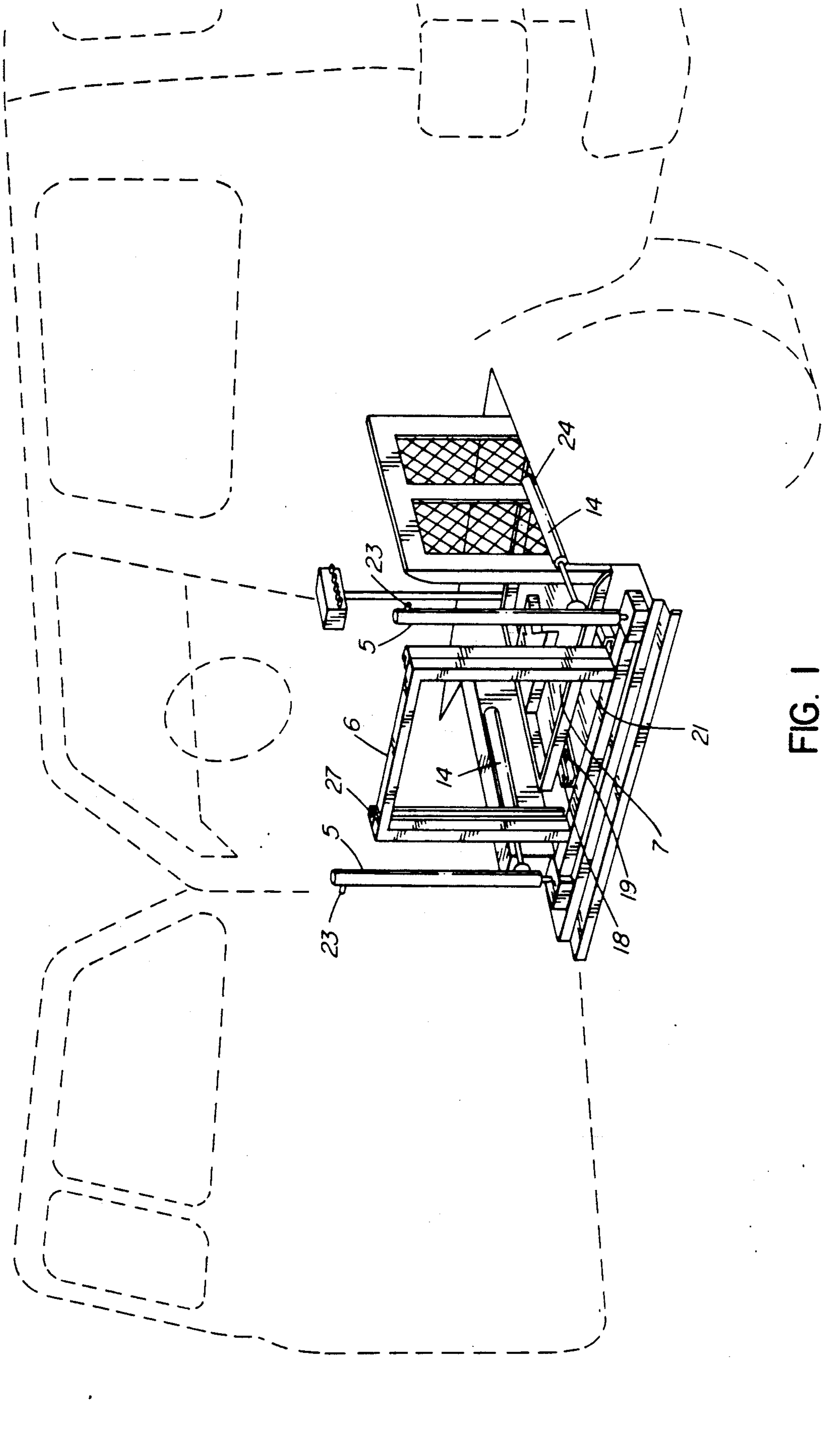
FIG. 1 is the first position shown in perspective view of the lift and transfer system in the stored and driving position.
Figure 6:
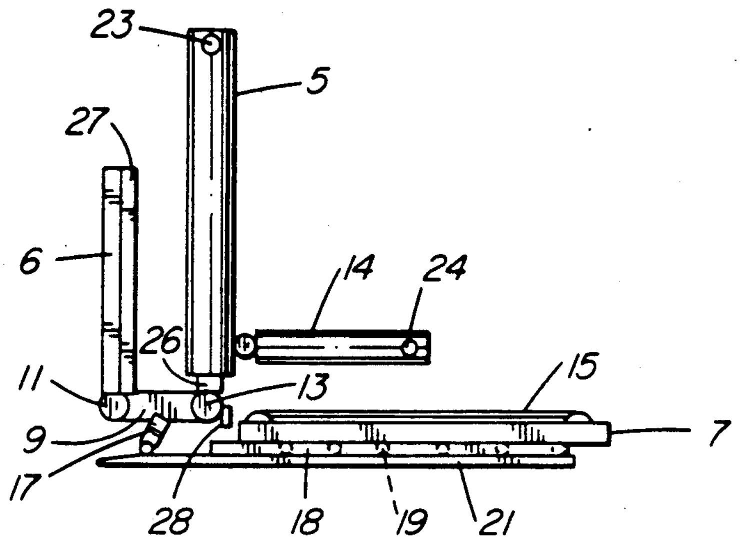
FIG. 6 is the detailed side view of the lift and transfer system in the stored and driving position.
Figure 13:
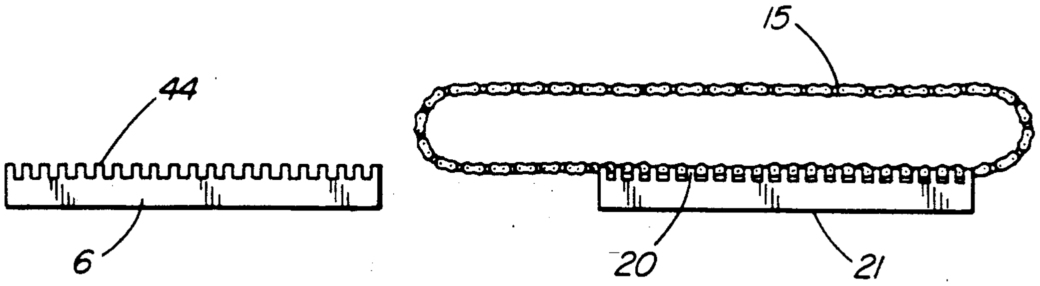
FIG. 13 is a side view of the caterpillar chain and the teeth on the floor of the vehicle and on the lift platform.

FIG. 1 (Location) and FIG. 6 (Detail) are the first position with the lift frame (6) and lift platform (7) in the storage or driving position. The lift cylinders (5) are vertical and are attached to the vehicle at trunnion (23), the swing cylinders (14) are horizontal and are attached to the vehicle at trunnion (24), the lift frame (6) is in the vertical position and is attached to a shaft which joins the two lift cylinders, this shaft is attached to an extension (9) which is attached to the rod end (13), the lever (17) is in contact with the vehicle floor (21) and holds the lift frame in the vertical position, the track (18) is secured to the floor of the vehicle and the roller bearing (19) are attached to the lift platform (7) and secure the lift platform to the floor of the vehicle, the caterpillar chain (15) FIG. 13 (details) is connected to teeth (20) which are attached to the floor of the vehicle (21) and prevents the platform from moving.

Figure 2:
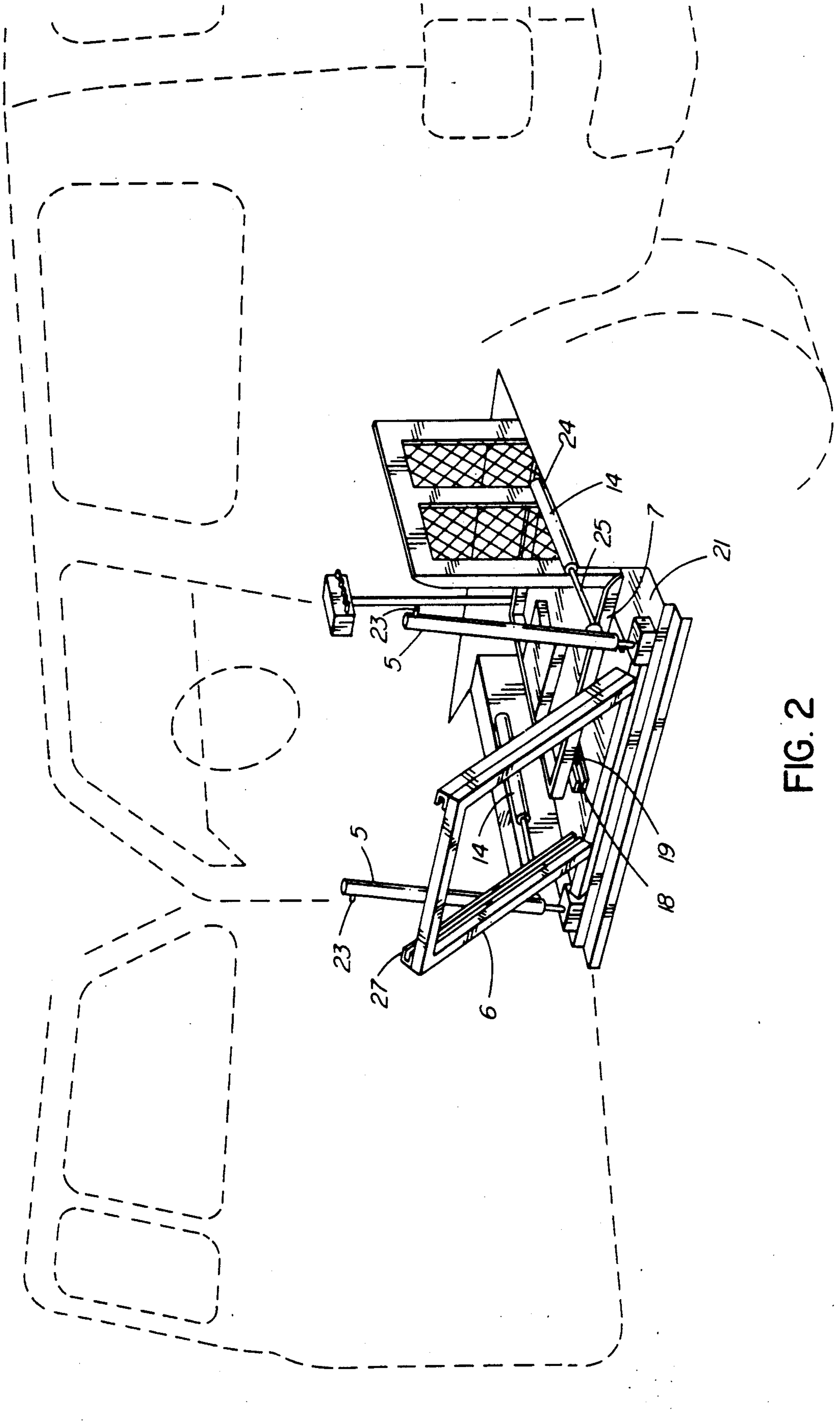
FIG. 2 is between the first position and the second position shown in perspective view of the lift and transfer system.
Figure 7:
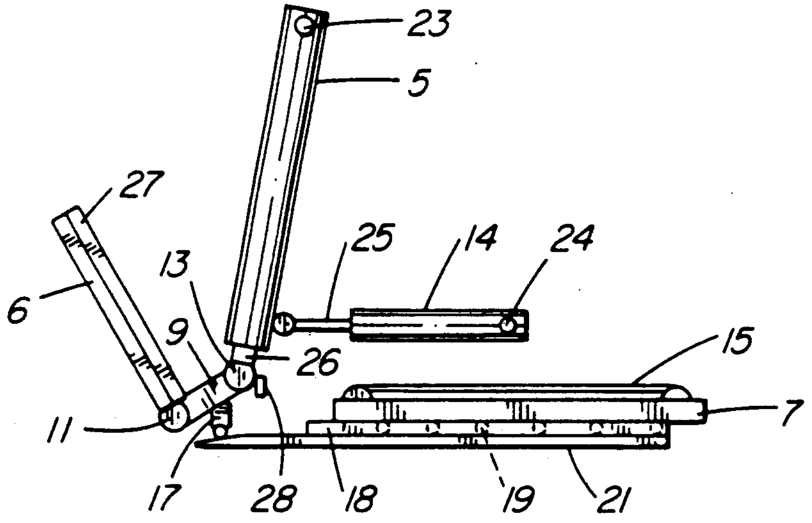
FIG. 7 is the detailed side view between the first position and the second position of the lift and transfer system.

FIG. 2 (Location) and FIG. 7 (Detail) is between the first position stored in the vehicle and the second position with the lift frame positioned to accept the lift platform. The piston (14) is powered and the piston rod (25) extends and swings the lift cylinder (5) out rotating on the trunnion (23). This allows the lever (17) to follow the slope on the vehicle floor (21) which allows the lift frame (6) and shaft (11), to rotate down from rod end (13).

Figure 3:
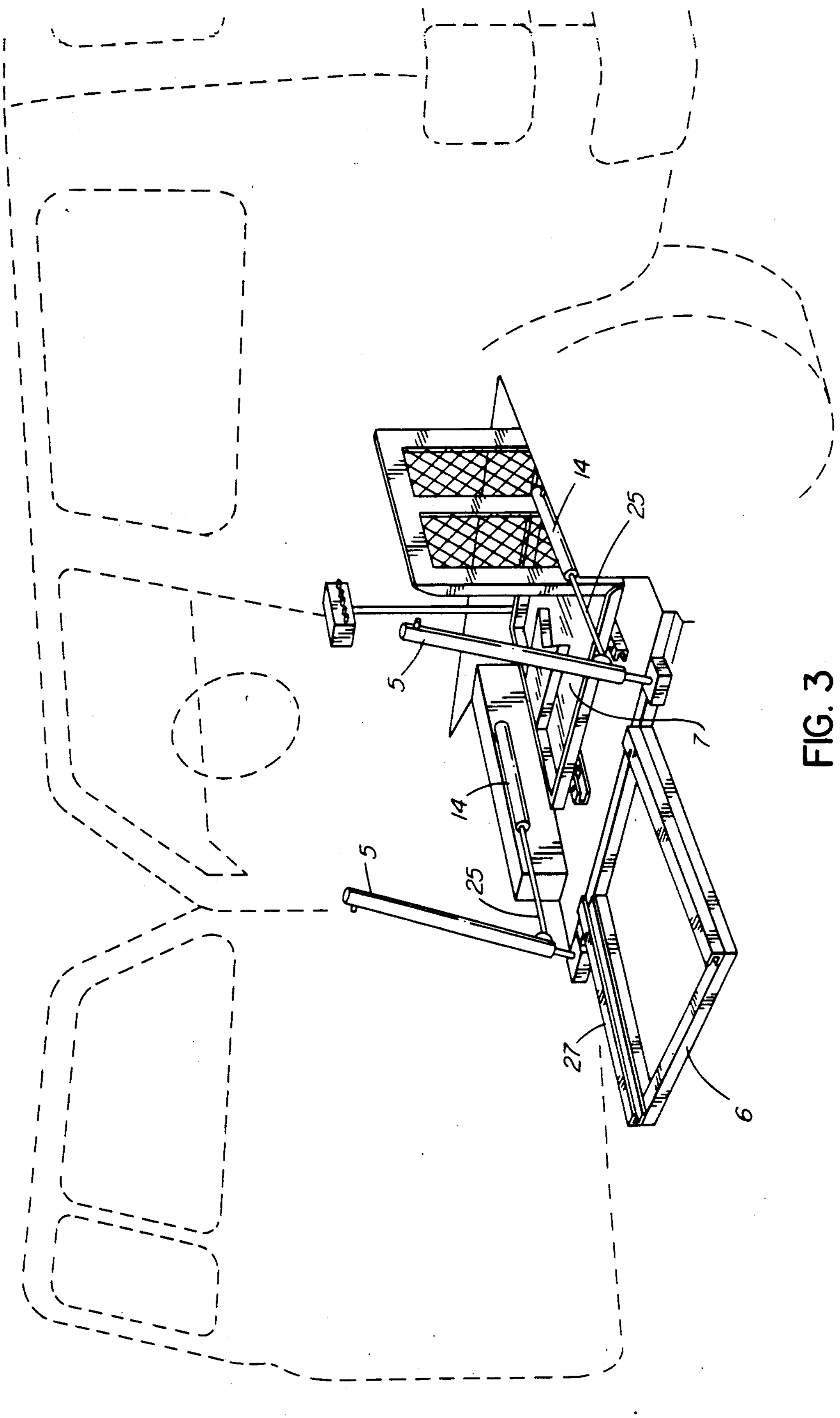
FIG. 3 is the second position shown in perspective view of the lift and transfer system with the lift frame extended out and horizontal and in position to accept the platform.
Figure 8:
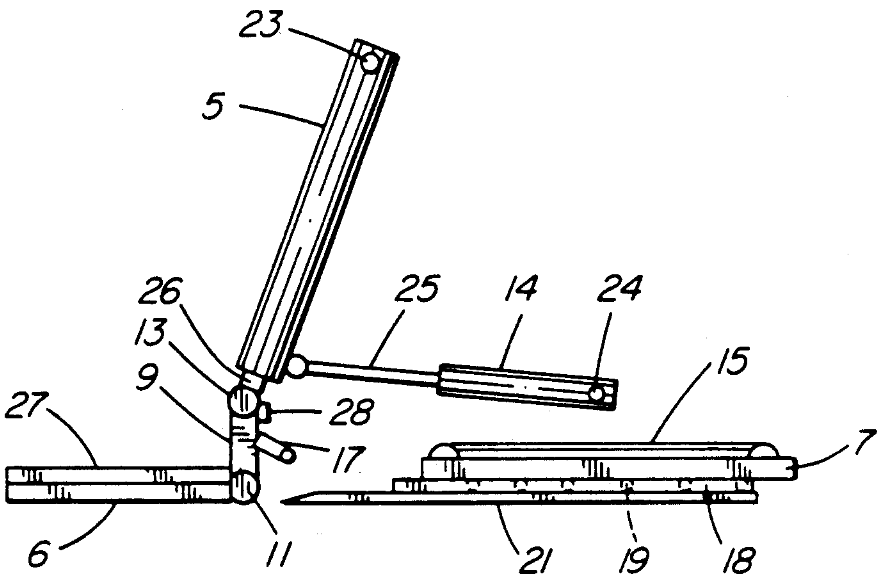
FIG. 8 is the detailed side view of the lift and transfer system with the lift frame extended out and horizontal and in position to accept the platform.

FIG. 3 (Location) and FIG. 8 (Detail) is the lift frame in the second position and aligned to accept the lift platform. The piston rod (25) is fully extended and the lift frame (6) is in a horizontal position held there by stop (28) on rod end (13).

Figure 4:
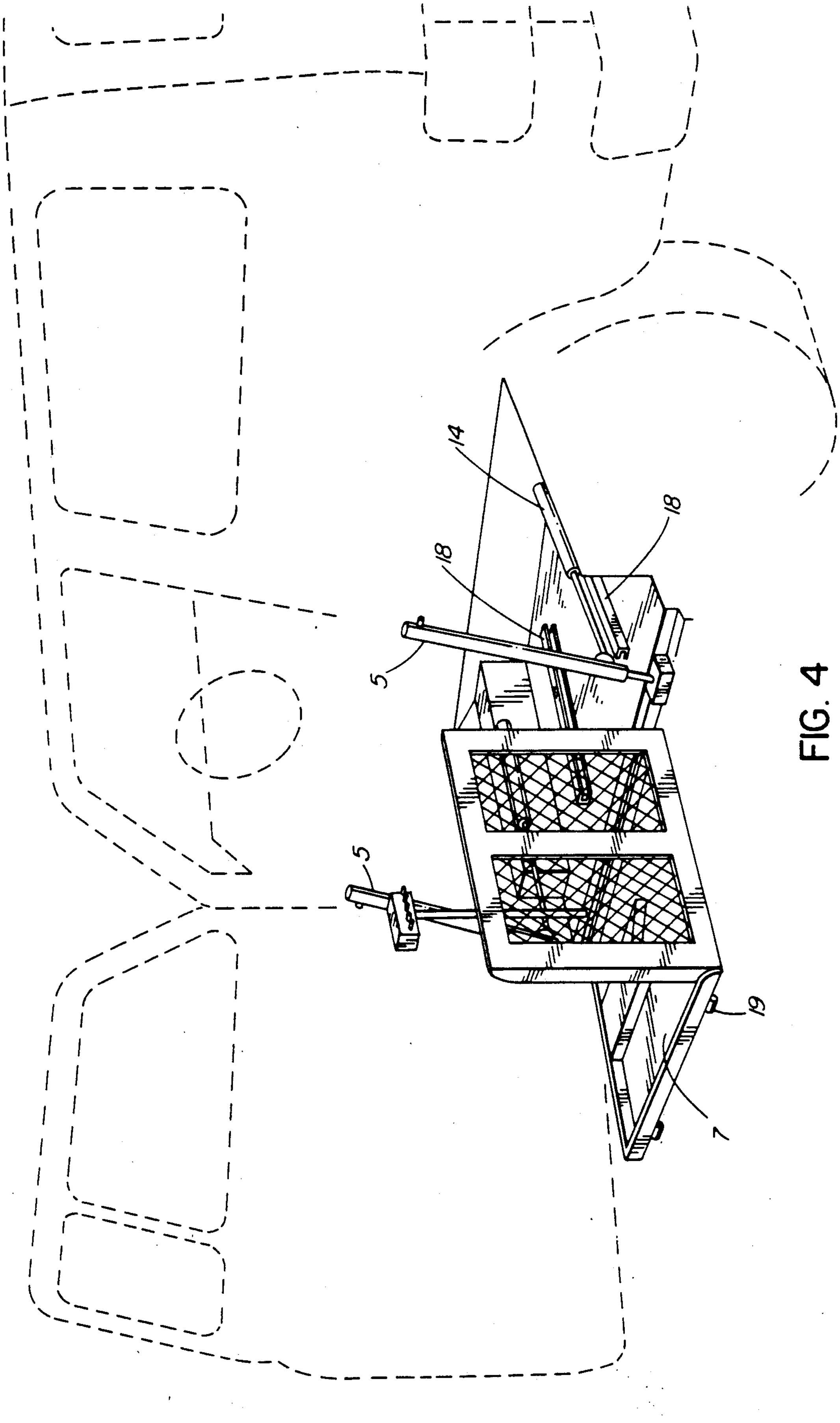
FIG. 4 is the third position shown in perspective view of the lift and transfer system with the platform cantilevered over the lift frame.
Figure 9:
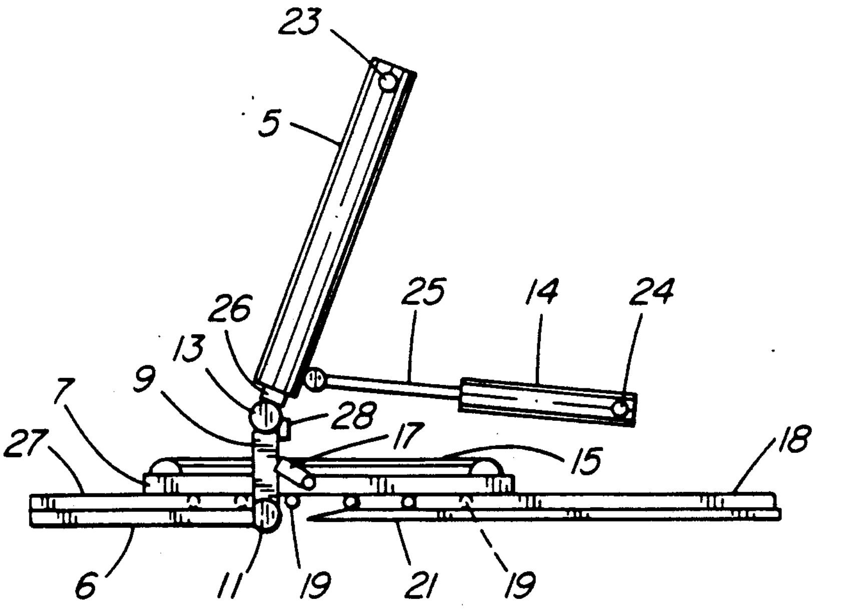
FIG. 9 is the detailed side view of the platform moved part way onto the lift frame.
Figure 10:
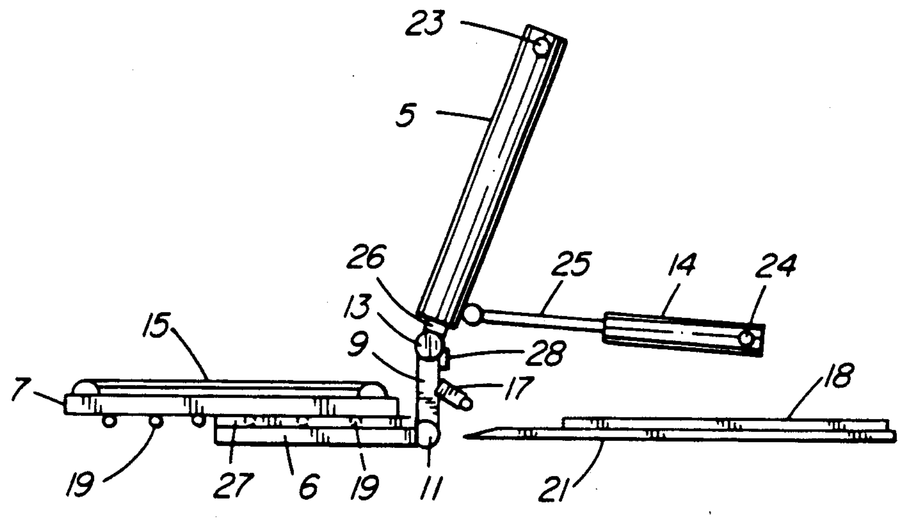
FIG. 10 is the detailed side view of the platform in the third position on the lift frame.

FIG. 4 (Location) and FIG. 9 and FIG. 10 (Details) is the lift platform moving into the third position. FIG. 9 the platform is crossing an eight inch gap, the roller bearings are engaged in the track (18) on the floor of the vehicle as well as the track (27) on the lift frame. The movement is accomplished by a motor (8) FIG. 12 driving the caterpillar chain engaging both the teeth (20) FIG. 13 and the teeth (44). FIG. 10 is the platform (7) cantilevered over the lift frame.

Figure 5:
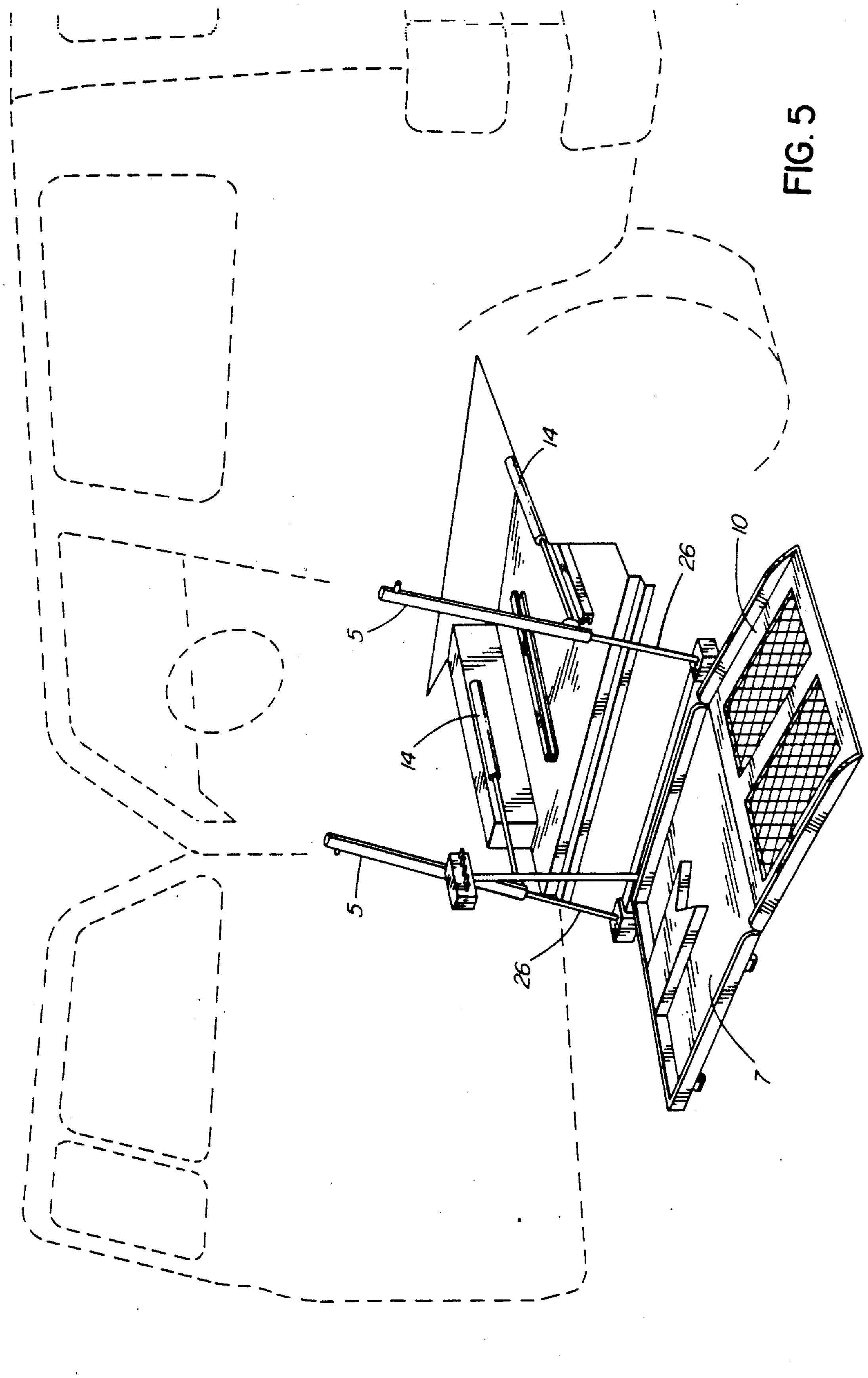
FIG. 5 is the fourth position shown in perspective view of the lift and transfer system at ground elevation.
Figure 11:
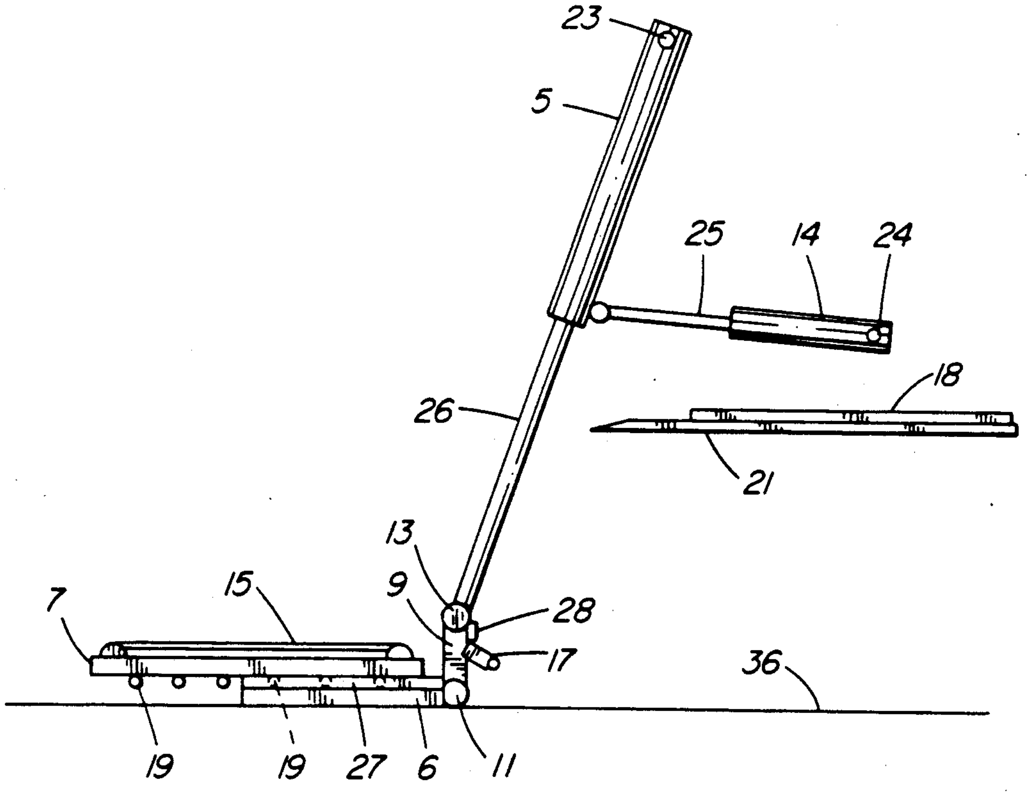
FIG. 11 is the detailed side view of the lift and transfer system at ground elevation.

FIG. 5 (Location) and FIG. 11 (Detail) is the lift frame (6) and platform (7) in the third position at ground level (36). The piston rod (26) is extended and the ramp (10) has been lowered by means of a motor (40) FIG. 12 activating a rack (41) attached to a rod (42).

Figure 12:
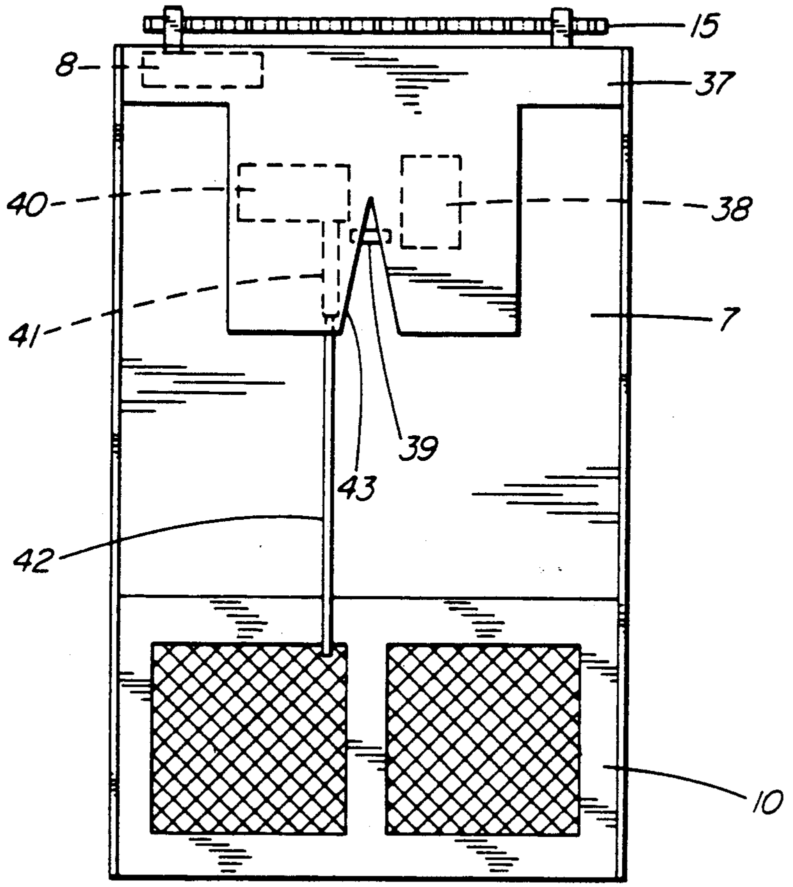
FIG. 12 is a plan view of the wheelchair platform.

FIG. 12 shows the location of the motor (8) to drive the caterpillar chain (15), the motor guard (37), the motor (38) to drive the pin (39) which hold the wheelchair and the guide (43) for the wheelchair attachment.

Figure 14:
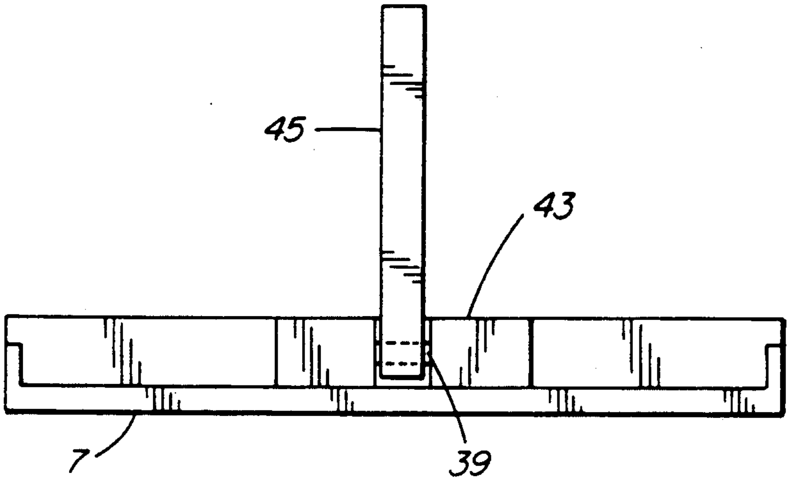
FIG. 14 is a end view of the wheelchair platform and the wheelchair attachment mechanism.

FIG. 14 is the wheelchair hold down attachment (45) in position with the bolt (39) securing the attachment to the platform.

Figure 15:
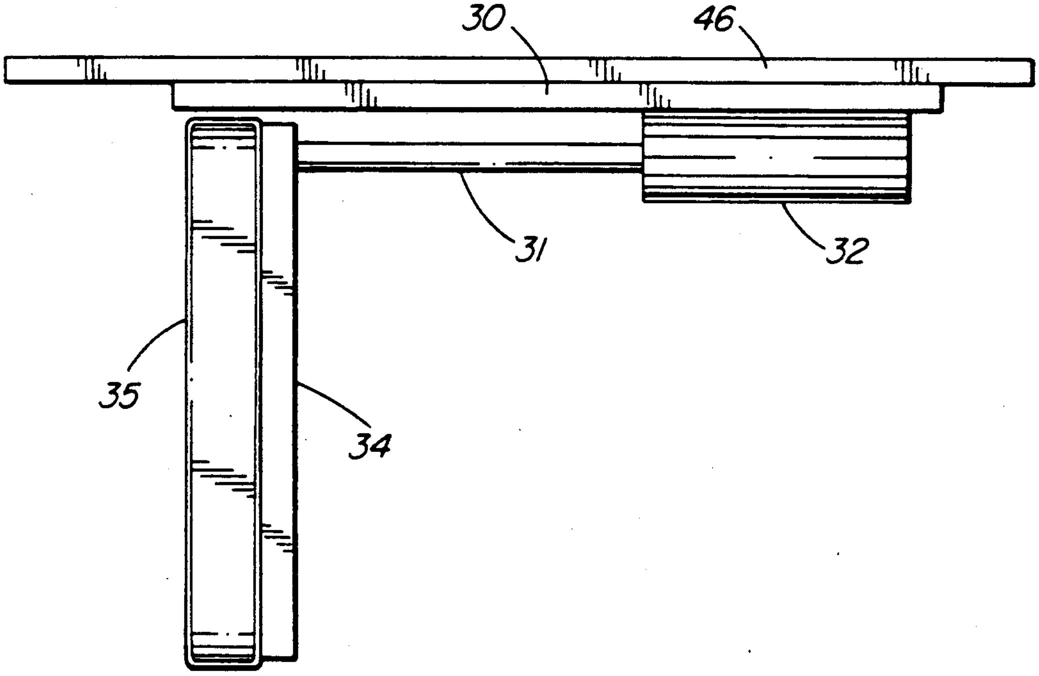
FIG. 15 is a side view of the head and shoulder restraint.

FIG. 15 is the head and shoulder restraint. The reinforcing plate (30) is attached to the roof (46) of the vehicle. The motor (32) is attached to the reinforcing plate. The head and shoulder restraint is moved by a rack (31) attached to the motor. This rack is attached to a backing plate (34) and the padded restraint (35) is attached to the backing plate.

Figure 16:
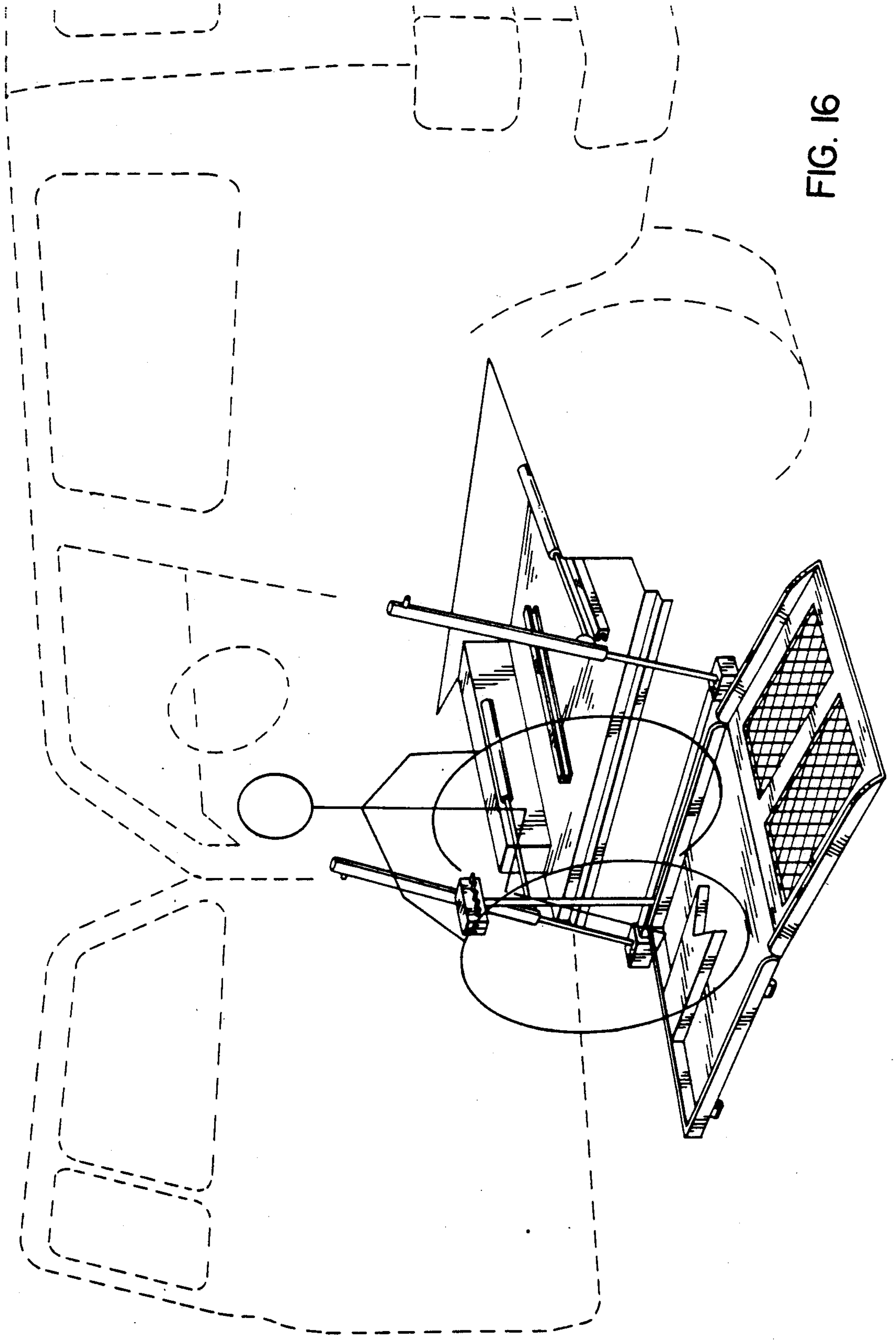
FIG. 16 is the same as FIG. 5 except it shows a outline of a person in a wheelchair on the platform.
Figure 17:
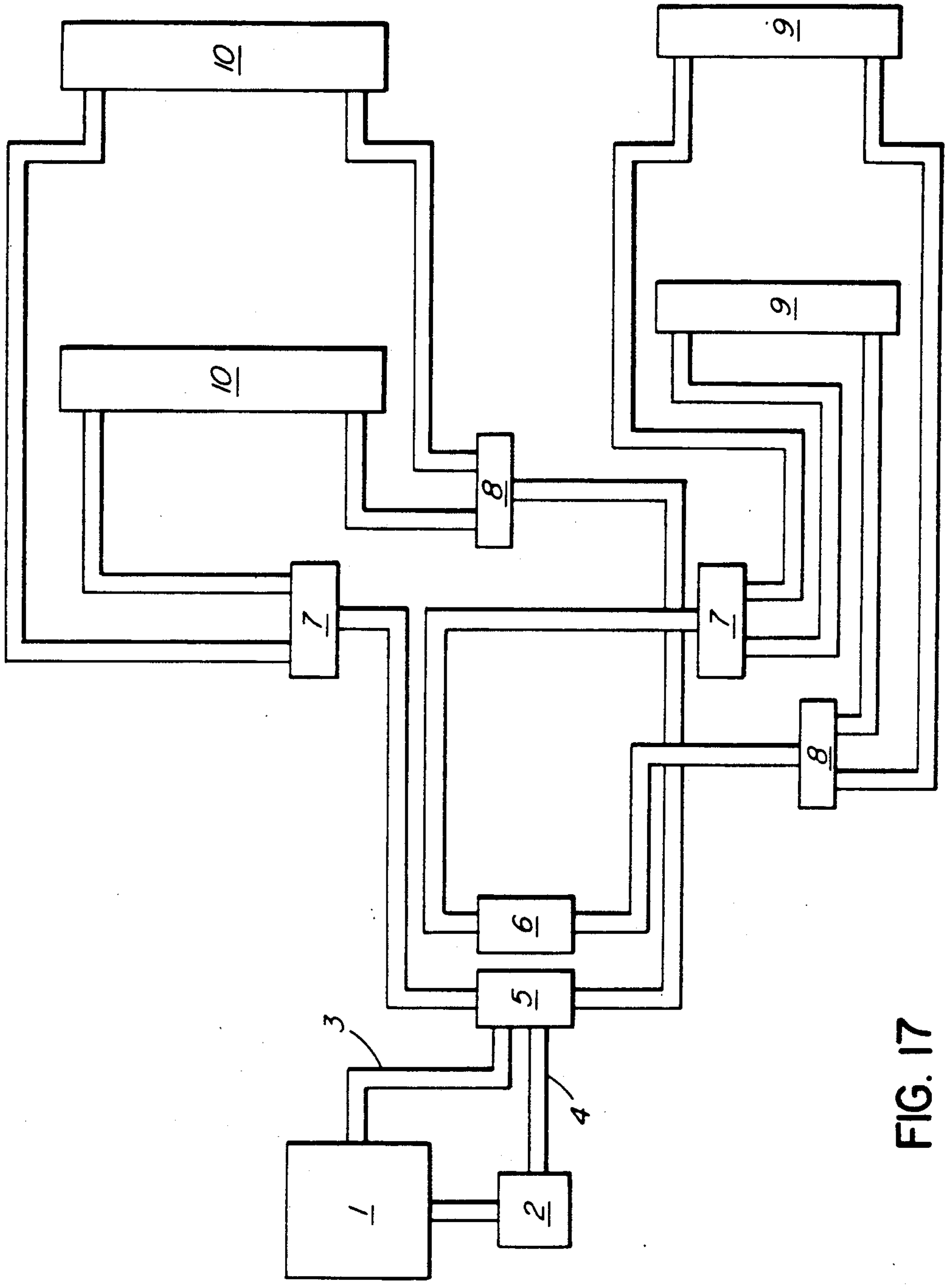
FIG. 17 is a hydraulic schematic.
Figure 18:
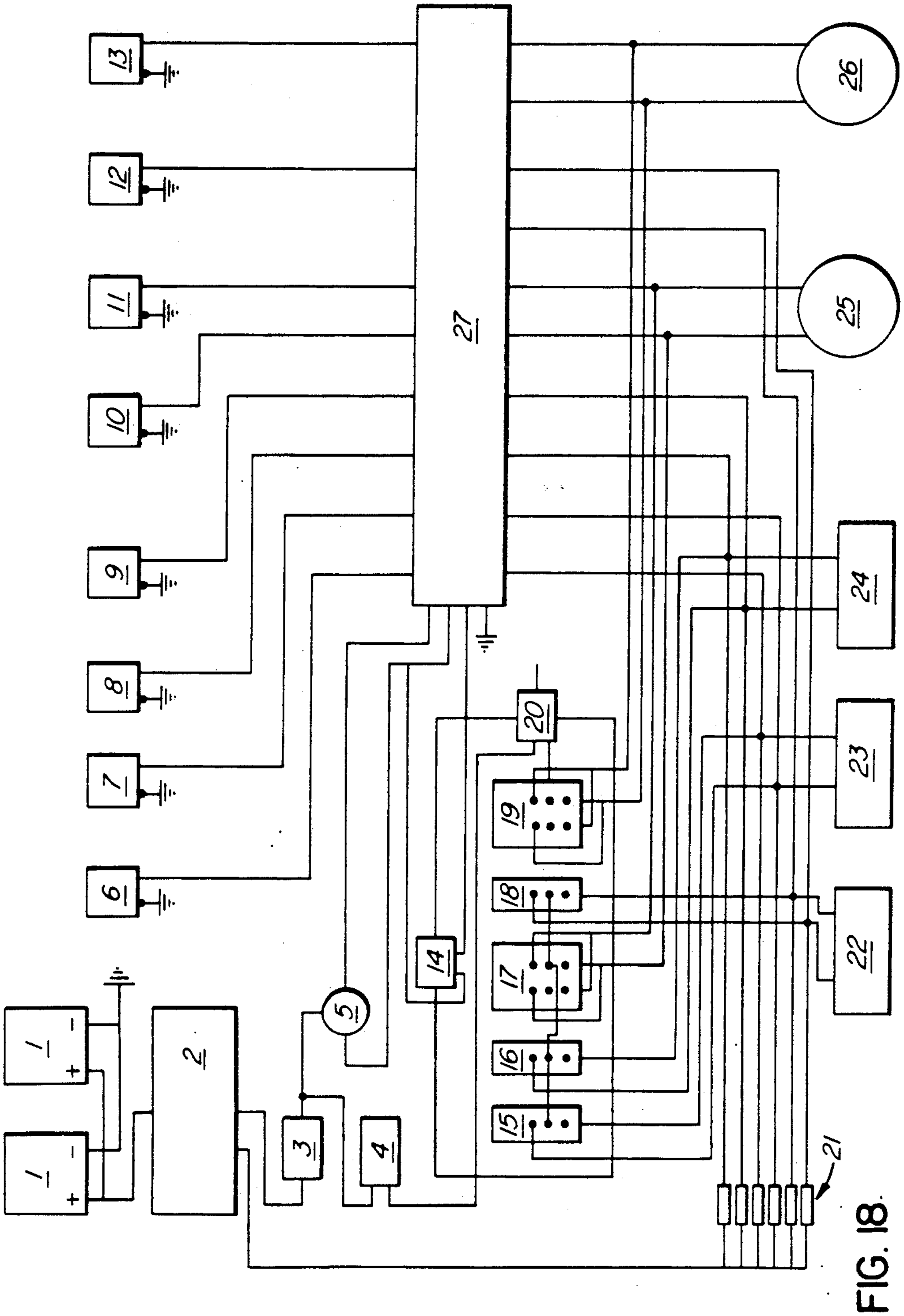
FIG. 18 is an electrical schematic of the lift and transfer system.

FIG. 16 is the lift frame and platform at ground elevation with an outline of the position of a person in a wheelchair

HYDRAULIC SCHEMATIC: FIG. 17

#1—Reservoir
#2—Hydraulic Pump
#3—Return line to reservoir
#4—Pressure line
#5—Lift valve
#6—Swing valve
#7—Flow dividers
#8—Tees
#9—Swing cylinders
#10—Lift cylinders

ELECTRIC SCHEMATIC: FIG. 18

#1—2 only 12 V batteries
#2—12 V motor driving hydraulic pump
#3—10 amp breaker
#4—"Park" cut off switch
#5—Key switch
#6—Limit switch—Door out
#7—Limit switch—Swing out
#8—Limit switch—Swing in
#9—Limit switch—Platform out
#10—Limit switch—Platform in
#11—Limit switch—Lift down
#12—Limit switch—Lift up
#13—Limit switch—Ramp up
#14—Computer switch SPDT Spring switch
#15—SPDT spring switch
#16—SPDT spring switch
#17—DPDT spring switch
#18—SPDT spring switch
#19—DPDT spring switch
#20—Safety switch SPDT detente
#21—6 only 3 amp. diodes
#22—12 V solenoid valve—lift
#23—12 V motor—door
#24—12 V solenoid valve—swing
#25—12 V motor—platform
#26—12 V motor—ramp
#27—Logic board The embodiments of the invention in which and exclusive property of privilege is claimed are defined as follows:

1. A Wheelchair lift and transfer system for use with a vehicle and comprising: a lift frame and a movable lift platform which separates from the lift frame; and means for moving the lift frame and platform between a first position with the lift platform attached to the floor of a vehicle at a driver's position, the lift frame being folded under an arm rest of a vehicle door, a second position wherein the lift frame is extended outside the vehicle on a level with the floor of the vehicle, a third position wherein the lift platform is moved side-ways through a door opening over a gap and moved onto and cantilevered over the lift frame and a fourth position wherein the lift and platform assembly are lowered to ground level with a hinged ramp deployed so that a wheelchair may be driven forward and generally parallel to the longitudinal axis of a vehicle onto said platform when the lift frame is at the ground level position and back to said third position wherein the lift frame is raised to the level of the vehicle floor portion to bring first and second portions of track means into alignment whereby said platform and wheelchair may then be moved laterally of the vehicle along the track means into the vehicle at the driver's position.

2. The wheelchair lift and transfer system of claim 1 and further including a moveable head restraint as part of safety requirements for driving from the wheelchair, said head restraint attached to a plate which is attached to the roof of a vehicle and means for moving said head restraint forward and backward.

3. The wheelchair lift and transfer system of claim 1 and further including a system for securing the wheelchair to the lift platform; said system being an activated bolt which goes through an attachment on the wheelchair and anchors the wheelchair to the wheelchair platform at one point.

* * * * *